United States Patent [19]
McSwigan et al.

[11] Patent Number: 5,512,211
[45] Date of Patent: Apr. 30, 1996

[54] CONCENTRATED AQUEOUS DIALKYLSULFOSUCCINATE WETTING AGENT FORMULATION HAVING LOW VOLATILE ORGANIC COMPOUND CONTENT

[75] Inventors: Brian J. McSwigan, Princeton; Gerard E. Lindowdki, Freehold, both of N.J.

[73] Assignee: Cytec Technology Corp., Wilmington, Del.

[21] Appl. No.: 366,569

[22] Filed: Dec. 30, 1994

[51] Int. Cl.$^6$ .................................................. B01F 17/10
[52] U.S. Cl. .................... 252/353; 252/354; 252/355; 252/DIG. 1; 252/8.7; 252/8.75
[58] Field of Search ................ 252/8.6, 8.7, 8.75, 252/353, 355, DIG. 1, 354

[56] References Cited

U.S. PATENT DOCUMENTS

| | | | |
|---|---|---|---|
| T951,003 | 10/1976 | Bilkey et al. | 8/490 |
| 2,069,570 | 2/1937 | Albrecht | 252/354 |
| 2,310,074 | 2/1943 | Gotte | 8/609 |
| 3,236,583 | 2/1966 | Hees | 8/582 |
| 3,478,376 | 11/1969 | Daueble et al. | 8/589 |
| 3,521,989 | 7/1970 | Angliss et al. | 8/591 |
| 3,533,727 | 10/1970 | Grunwald et al. | 8/617 |
| 3,619,122 | 11/1971 | De Maria | 8/591 |
| 3,706,525 | 12/1972 | Blackwell et al. | 8/532 |
| 3,888,624 | 6/1975 | Blackwell et al. | 8/532 |
| 3,957,432 | 5/1976 | Kuryla | 8/527 |
| 3,960,486 | 6/1976 | Dauback et al. | 8/524 |
| 4,063,880 | 12/1977 | Tullio | 8/527 |
| 4,094,634 | 6/1978 | Becker et al. | 8/558 |
| 4,101,273 | 7/1978 | Matsuba et al. | 8/609 |
| 4,302,202 | 11/1981 | Sumner et al. | 8/455 |
| 4,385,901 | 5/1983 | Podder | 8/527 |
| 4,408,995 | 10/1983 | Guth et al. | 8/477 |
| 4,487,609 | 12/1984 | Putzar | 8/524 |
| 4,523,923 | 6/1985 | Buchel et al. | 8/524 |
| 4,539,368 | 9/1985 | Duncan et al. | 524/478 |
| 4,588,412 | 5/1986 | Hugelshofer | 8/524 |
| 4,604,100 | 8/1986 | Schneider et al. | 8/526 |
| 4,713,081 | 12/1987 | Becker | 8/527 |
| 4,985,162 | 1/1991 | Cole | 252/60 |
| 5,152,802 | 10/1992 | Berger et al. | 8/587 |

FOREIGN PATENT DOCUMENTS

| | | |
|---|---|---|
| 55-152790 | 2/1981 | Japan . |
| 56-26991 | 5/1981 | Japan . |
| 56-26989 | 5/1981 | Japan . |
| 62-252702 | 4/1988 | Japan . |
| 1-118589 | 7/1989 | Japan . |
| 1-318027 | 3/1990 | Japan . |
| 2-240194 | 12/1990 | Japan . |
| 2-292391 | 2/1991 | Japan . |
| 5-230476 | 12/1993 | Japan . |
| 6-256122 | 12/1994 | Japan . |

*Primary Examiner*—Anthony Green
*Attorney, Agent, or Firm*—Bart E. Lerman; Claire M. Schultz; Michael J. Kelly

[57] ABSTRACT

A concentrated aqueous dialkylsulfosuccinate wetting agent formulation containing at least 10% w/w of a dialkylsulfosuccinate, at least one nonionic surfactant cosolvent in an amount effective to assist in the solvation of the dialkylsulfosuccinate and water. The formulation has a low volatile organic compound content and generally has a high flash point.

31 Claims, No Drawings

CONCENTRATED AQUEOUS DIALKYLSULFOSUCCINATE WETTING AGENT FORMULATION HAVING LOW VOLATILE ORGANIC COMPOUND CONTENT

BACKGROUND OF THE INVENTION

1. Field of the Invention

This invention relates to a concentrated aqueous dialkylsulfosuccinate wetting agent formulation containing a dialkylsulfosuccinate, at least one nonionic surfactant and water. The concentrated formulation of this invention has an advantageously low volatile organic compound ("VOC") content and a high flash point.

2. Description of the Related Art

Dialkylsulfosuccinate wetting agents, such as dioctyl sodium sulfosuccinate, are widely used by the textile industry in textile dye compositions, as reactants by the emulsion polymerization industry, and by other industries as wetting agents in compositions such as paints, caulk sealants, industrial coatings and paper coatings. These industries require that the dialkylsulfosuccinate wetting agents be provided in concentrated formulations for purposes of economy and effective processing. Dialkylsulfosuccinates, however, are not highly soluble in water. Therefore, commercially available concentrated formulations of dialkylsulfosuccinates have been prepared by adding various alcohols, such as isopropanol, ethanol, or propylene glycol, as cosolvents to dissolve or maintain concentrated amounts of the dialkylsulfosuccinates in solution.

For example, AEROSOL® GPG, a tradename of a wetting agent formulation containing 70% by weight of the total weight of the composition (hereinafter "% w/w") of dioctyl sodium sulfosuccinate, 9% w/w of ethanol, and 21% w/w of water is available from CYTEC Industries, West Paterson, N.J. Such formulations provide an excellent delivery system for concentrated amounts of dialkylsulfosuccinates, but may have a somewhat high VOC content. There is a desire to reduce the VOC content of these formulations due to environmental concerns. Likewise, increasing safety and handling regulations regarding low flash point materials also make the use of high flash point materials more desirable.

A nonaqueous alcohol-free wetting agent formulation containing dioctyl sodium sulfosuccinate and a nonionic surfactant is known. The viscosity, however, of dialkylsulfosuccinate formulations that do not contain water tend to be disadvantageously high, particularly since such formulations must be pumpable and flowable to be effectively used in the processes of the textile and emulsion polymerization industry.

Thus, a concentrated aqueous dialkylsulfosuccinate formulation having low VOC content, i.e., being substantially free of volatile organic compounds, and a high flash point is highly desirable.

SUMMARY OF THE INVENTION

This invention is directed to a concentrated aqueous dialkylsulfosuccinate wetting agent formulation having low VOC content and a high flash point. More particularly, the wetting agent formulation of this invention comprises (a) at least about 10% w/w, more preferably at least about 40% w/w and most preferably at least about 60% w/w of a dialkylsulfosuccinate represented by the formula (I):

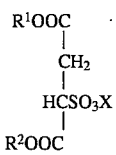

wherein $R^1$ and $R^2$ are independently selected from an alkyl group having five to thirteen carbon atoms and X is selected from the group consisting of an alkali metal, an alkaline earth metal, ammonium or a substituted ammonium radical; (b) at least one nonionic surfactant cosolvent in an amount effective to assist in the solvation of said dialkylsulfosuccinate; and (c) water. The inventive formulation is substantially free of volatile organic compounds due to the substantial absence of alcohols and generally has a high flash point, preferably greater than or equal to 141° F.

Preferably $R^1$ and $R^2$ are selected from the group consisting of $C_5$, $C_6$, $C_8$ and $C_{13}$ alkyl groups. These groups may be derived, for example, from respectively, amyl alcohol, methyl amyl alcohol (1,4-dimethyl butyl alcohol), 2-ethyl hexanol, and mixed isomers of alcohols. Most preferably, $R^1$ and $R^2$ are a 2-ethylhexyl group. It is also preferable that X is an alkali metal or alkaline earth metal and most preferably is sodium. The most preferred dialkylsulfosuccinate is dioctyl sodium sulfosuccinate. The nonionic surfactant may be, for example, any ethoxylated alcohol, and most preferably is selected from the group consisting of TDA 8.5 (an ethoxylated tridecyl alcohol having about 8.5 moles of ethylene oxide units per mole of hydroxyl group), NP-9 (an ethoxylated nonylphenol having about 9 moles of ethylene oxide units per mole of hydroxyl group) and PEG 400 (a 400 molecular weight polyethylene glycol), or mixtures thereof. Generally at least about 10% w/w water is present in the formulation.

Other optional components may be provided in the inventive formulation as long as they do not provide any substantial amount of VOC content. Such volatile organic compounds include, for example, alcohols such as ethanol, isopropanol, propylene glycol and the like.

A preferred embodiment of the present invention is directed to a concentrated aqueous dioctyl sodium sulfosuccinate wetting agent formulation comprising: (a) about 40 to 75% w/w of dioctyl sodium sulfosuccinate; (b) about 10 to 20% w/w of a nonionic surfactant cosolvent selected from the group consisting of TDA 8.5, NP-9, PEG 400 and mixtures thereof; and (c) about 10 to 20% w/w of water, wherein said formulation has a low VOC content and a flash point of 141° F. or greater.

DETAILED DESCRIPTION OF THE INVENTION

The concentrated aqueous dialkylsulfosuccinate wetting agent formulation of this invention having a low VOC content is comprised of a dialkylsulfosuccinate represented by formula (I), at least one nonionic surfactant and water. The formulations of this invention also generally have a high flash point.

The dialkylsulfosuccinates are known wetting agents having relatively poor solubility in water. The water solubility of the dialkylsulfosuccinates generally depends on the size of the ester forming alkyl groups. For example, a sodium sulfosuccinate diester of alkyl groups with 13 carbons has a water solubility of about 0.1% w/w, while a sulfosuccinate diester of alkyl groups with 5 carbons has a water solubility of about 40% w/w. Dioctyl sodium sulfosuccinate, the most preferred dialkylsulfosuccinate, has a water solubility of approximately 1.5% w/w. Dioctyl sodium sulfosuccinate is the CTFA name for the sodium salt of the diester of an octyl alcohol and sulfosuccinic acid which conforms to the following formula:

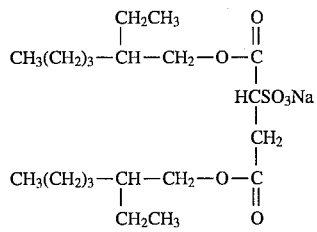

Generally, the formulations of this invention contain at least about 10% w/w of dialkylsulfosuccinate. In a preferred aspect of this invention the formulation contains dialkylsulfosuccinate in an amount ranging from about 40 to about 75% w/w, and most preferably from about 60 to about 75% w/w. The amount of dialkylsulfosuccinate included in the formulation is only limited by the requirement that the formulations be pumpable and flowable so as to be useful in industrial processes employing dialkylsulfosuccinate wetting agents.

The nonionic surfactant employed in the present invention serves as a cosolvent to foster the dissolution of the dialkylsulfosuccinates in water. Nonionic surfactants are readily available and well known to those of ordinary skill in the art. In general any ethoxylated alcohol can be employed as the nonionic surfactant in the present invention.

Exemplary nonionic surfactants include, without limitation, addition products of for example 5 to 50 moles of alkylene oxides, particularly ethylene oxide, where individual ethylene oxide units can be replaced by substituted epoxides, such as styrene oxide and/or propylene oxide, with higher fatty acids or with saturated or unsaturated alcohols, mercaptans or amines having 8 to 20 carbon atoms, or with alkylphenols or alkylthiophenols, the alkyl groups of which each contain at least 7 carbon atoms; reaction products of higher molecular fatty acids and hydroxyalkylamines, which can be produced for example from higher molecular fatty acids, preferably those having 8 to 20 carbon atoms, for example caprylic acid, stearic acid, oleic acid and in particular the acid mixture described as coconut oil fatty acid, and hydroxyalkylamines, such as triethanolamine or preferably diethanol amine, as well as mixtures of these amines, such compounds being described in U.S. Pat. No. 2,089,212, the disclosure of which is incorporated by reference herein; phenol ethers, such a p-nonylphenol, etherified with about 9 moles of ethylene oxide, ricinoleic acid esters having 15 moles of ethylene oxides and hydroabietyl alcohol etherified with about 25 moles of ethylene oxide; fatty alcohol polyglycol ethers, particularly those having 20–100 moles of ethylene oxide, such as stearyl-oleyl alcohol, etherified with 80 moles of ethylene oxide, and alkyl alcohol, etherified with 20 to 80 moles of ethylene oxide; alkylene oxide, particularly ethylene oxide condensation products, where individual ethylene oxide units can be replaced by substituted epoxides, such as styrene oxide and/or preferably propylene oxide; and copolymers of ethylene oxide and propylene oxide of the formula:

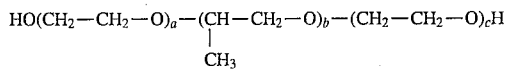

wherein the sum of a and c is a number between 200 and 400, and b is a number between 30 and 80.

Particularly preferred nonionic surfactants include NP-9 (nonylphenol having about 9 moles of ethylene oxide units per mole of hydroxyl group; available from Shell Chemical or Union Carbide), TDA 8.5 (ethoxylated tridecyl alcohol having about 8.5 moles of ethylene oxide units per mole of alcohol; available from Rhone Poulenc), PEG 400 (a 400 molecular weight polyethylene glycol; available from Union Carbide) and mixtures therefore. Generally the nonionic surfactant is present in the formulation in a range from about 10% to about 20% w/w, and preferably in a range of about 12% to about 17% w/w.

Generally there is at least about 10% w/w water present in the wetting agent formulations of the present invention. The water is essential component of the concentrated dialkylsulfosuccinate wetting agent formulations and must be present in an amount to ensure that the inventive formulation has a viscosity at about 25° C. of 700 cps or less, preferably 500 cps or less as measured, for example on a Brookfield Model LVT viscometer. The viscosity of the wetting agent formulation must be low enough so that the formulation is flowable and pumpable in the aforementioned industrial processes which use dialkylsulfosuccinate wetting agents. Most preferably, water is present in the formulations in range of from about 10% w/w to about 20% w/w.

The concentrated aqueous dialkylsulfosuccinate wetting agent formulations may also include other optional ingredients such as defoamers, dyes, pigment dispersions or other inert additives. Such optional ingredients may be included so long as they do not adversely effect the formulation by substantially raising the VOC content or substantially lowering the flash point.

By low VOC content it is meant that there is less than about 1% w/w volatile organic compounds, preferably less than about 0.5% w/w. VOC is well understood by those skilled in the art and includes, for example, alcohols such as ethanol, isopropanol, hexanol, octanol, propylene glycol and the like. By substantially free of VOC content is meant that the only VOC content present in the formulation is de minimis, generally resulting from VOC impurities of the constituents of the inventive formulation. For example, it is known that dioctyl sodium sulfosuccinate contains less than about 0.5% w/w of 2-ethylhexanol, typically about 0.2% w/w.

VOC content may be readily calculated by any number of methods available to those skilled in the art. For example, a simple "solids" test may be used by accurately weighing 0.5 grams (±0.0001 g) of sample into a tared flat-bottom dish. Then 2 ml of 50/50 by volume isopropanol/water solutions is added, and swirled gently to mix and distribute the sample. Thereafter, the sample is placed on a hot plate or in an oven at about 110° C. for about 1 hour, then cooled in a desiccator and weighed to a constant weight. The following calculation is then used to determine VOC content.

$$\% \text{ VOC} = [1-(\text{grams residue/grams sample})+(\% \text{ water}/100)] \times 100$$

Another method of calculating VOC content is by gas chromatographic analysis, a well known method to one of ordinary skilled in the art.

As noted previously, the concentrated aqueous dialkylsulfosuccinate wetting agent formulations of this invention have an advantageously relatively high flash point, e.g., 141°

F. or greater and preferably 200° F. or greater. Flash point may be measured by any number of well known methods, such as Pensky Marten closed cup, Setaflash closed cup or Tag closed cup methods.

The formulation of the invention may be prepared by mixing the water and nonionic surfactant cosolvent. The mixture is then preferably heated, most preferably to a temperature of about 75° to 80° C., after which the dialkylsulfosuccinate is added. It is preferable to slowly add the dialkylsulfosuccinate to enhance solvation. It is also possible to produce the concentrated aqueous dioctyl sodium sulfosuccinate wetting agent formulation by direct sulfonation of dioctyl maleate in the blend of water and nonionic surfactant to produce the dioctyl sodium sulfosuccinate in situ.

The formulations of this invention may be used as wetting agents or as reactants in the emulsion polymerization industry or in any other application in which dialkylsulfosuccinates may be employed. The inventive formulations, for example, may be used by the textile dye industry as a wetting agent in textile dye compositions to enhance dye absorption into fibers. The formulations may also be used as wetting agents in paints, caulk sealants, industrial coatings, paper coatings or in overprint varnish formulations. Other applications for the formulations of this invention may include the use of dialkylsulfosuccinates as surfactants or wetting agent in detergents or cleaners. The method of using dialkylsulfosuccinates in the aforementioned applications is well understood by those skilled in the art.

The examples which follow are intended as an illustration of certain preferred embodiments of the invention, and no limitation of the invention is implied.

EXAMPLES 1–5

Five different concentrated dioctyl sodium sulfosuccinate wetting agent formulations were prepared in water, each having the composition set forth in Table 1 below.

TABLE 1

| Formulation | (% w/w) DOSS[1] | (% w/w) NP-9 | (% w/w) PEG 400 | (% w/w) TDA 8.5 | (% w/w) Wetting[3] |
|---|---|---|---|---|---|
| 1 | 70 | 15 | — | — | 12 |
| 2 | 75 | 8 | 4 | — | 12 |
| 3 | 75 | — | 10 | — | 12 |
| 4 | 70 | — | — | 15 | 11 |
| 5 | 75 | — | 6 | 6 | 12 |
| Control[2] | | | | | 12 |

[1]- dioctyl sodium sulfosuccinate
[2]- Tiarco Octowet 70 - Commercially available DOSS formulation containing alcohols
[3]- Drave's wetting: Rate at which 0.5 g surfactant (as supplied)/liter of water solution penetrates a standardized bundle of cotton All the inventive formulations listed above in Table 1 were liquid at room temperature and remained liquid at approximately 25° F. In addition, the inventive formulations performed in a substantially equivalent manner as wetting agents compared to the commercial control as illustrated by the Drave's wetting results. Formulation 1 was tested for VOC content using the aforementioned "solids" test. The test indicated that the inventive formulation had a VOC content of 0.3% w/w. The Tiarco Octowet 70 Control (68% solids) was tested for VOC content by GC and flash point by the Tag closed cup method. The control had a VOC content of about 7.0% w/w (3.5% w/w 2-ethylhexanol and 3.5% isopropanol) with a flash point of 100° F. It is believed that the flash point of the inventive formulations set forth in Table 1 are all greater than 141° F. because of the substantial absence of VOC. The above-noted results indicate that the concentrated aqueous dialkylsulfosuccinate wetting agent formulations of this invention advantageously have a low VOC content and a relatively high flash point, but perform in a substantially equivalent manner compared to commercially available high VOC low flash point formulations.

Other variations and modifications of this invention will be obvious to those skilled in the art.

We claim:

1. A concentrated aqueous dialkylsulfosuccinate wetting agent formulation comprising:

(a) at least about 60% w/w of a dialkyl sulfosuccinate represented by the formula (I):

wherein $R^1$ and $R^2$ are independently selected from an alkyl group having five to thirteen carbon atoms and X is selected from the group consisting of an alkali metal, an alkaline earth metal, ammonium or a substituted ammonium radical;

(b) at least one nonionic surfactant cosolvent in an amount effective to assist in the solvation of said dialkylsulfosuccinate; and (c) water, wherein said formulation is substantially free of volatile organic compounds.

2. The concentrated aqueous dialkylsulfosuccinate wetting agent formulation according to claim 1, wherein $R^1$ and $R^2$ are selected from the group consisting of $C_5$, $C_6$, $C_8$ and $C_{13}$ alkyl groups.

3. The concentrated aqueous dialkylsulfosuccinate wetting agent formulation according to claim 1, wherein X is an alkali-metal or an alkaline earth metal.

4. The concentrated aqueous dialkylsulfosuccinate wetting agent formulation according to claim 1, wherein said dialkylsulfosuccinate is dioctyl sodium sulfosuccinate.

5. The concentrated aqueous dialkylsulfosuccinate wetting agent formulation according to claim 1, wherein said nonionic surfactant cosolvent is an ethoxylated alcohol.

6. The concentrated aqueous dialkylsulfosuccinate wetting agent formulation according to claim 1, wherein said nonionic surfactant is present in said formulation in a range of about 10 to about 20% w/w.

7. The concentrated aqueous dialkylsulfosuccinate wetting agent formulation of claim 1, wherein said nonionic surfactant is present in said formulation in a range of about 12 to about 17% w/w.

8. The concentrated aqueous dialkylsulfosuccinate wetting agent formulation of claim 5, wherein said ethoxylated alcohol is selected from the group consisting of (1) ethoxylated tridecyl alcohol having about 8.5 moles of ethylene oxide units per mole of hydroxyl group, (ii) ethoxylated nonylphenol having about 9 moles of ethylene oxide units per mole of hydroxyl group, (iii) polyethylene glycol having a molecular weight of about 400 and (iv) mixtures thereof.

9. The concentrated aqueous dialkylsulfosuccinate wetting agent formulation according to claim 1, wherein at least about 10% w/w of the water is present in the formulation.

10. The concentrated aqueous dialkylsulfosuccinate wetting agent formulation according to claim 1, wherein said water is present in said formulation in a range of about 10% to about 20% w/w.

11. The concentrated aqueous dialkylsulfosuccinate wetting agent formulation according to claim 1, wherein a viscosity of said formulation is about 700 cps or less.

12. The concentrated aqueous dialkylsulfosuccinate wetting agent formulation according to claim 1, wherein a viscosity of said formulation is about 500 cps or less.

13. The concentrated aqueous dialkylsulfosuccinate wetting agent formulation according to claim 1, wherein a flash point of said formulation is 141° F. or greater.

14. The concentrated aqueous dialkylsulfosuccinate wetting agent formulation according to claim 1, wherein a flash point of said formulation is 200° F. or greater.

15. The concentrated aqueous dialkylsulfosuccinate wetting agent formulation according to claim 1 comprising:
    (a) from about 60 to about 75% w/w of said dialkylsulfosuccinate;
    (b) from about 10 to about 20% w/w of said non-ionic surfactant cosolvent; and
    (c) from about 10 to about 20% w/w of water.

16. The concentrated aqueous dialkylsulfosuccinate wetting agent formulation according to claim 15, wherein a viscosity of said formulation is about 700 cps or less, and wherein a flash point of said formulation is 141° F. or greater.

17. A concentrated aqueous dioctyl sodium sulfosuccinate wetting agent formulation comprising:
    (a) about 60 to about 75% w/w of dioctyl sodium sulfosuccinate;
    (b) about 10 to about 20% w/w of a nonionic surfactant cosolvent; and
    (c) about 10 to about 20% w/w water, wherein said formulation is substantially free of volatile organic compounds.

18. The concentrated aqueous dioctyl sodium sulfosuccinate wetting agent formulation according to claim 17, wherein said nonionic surfactant cosolvent is selected from the group consisting of
    (i) ethoxylated tridecyl alcohol having about 8.5 moles of ethylene oxide units per mole of hydroxyl group,
    (ii) ethoxylated nonylphenol having about 9 moles of ethylene oxide units per mole of hydroxyl group,
    (iii) polyethylene glycol having a molecular weight of about 400, and
    (iv) mixtures thereof.

19. A concentrated aqueous dialkylsulfosuccinate wetting agent formulation comprising:
    (a) at least about 40% w/w of a dialkyl sulfosuccinate represented by the formula (I):

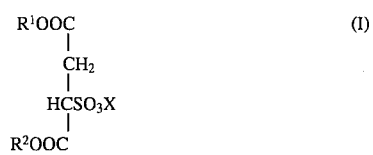

(I)

wherein $R^1$ and $R^2$ are independently selected from an alkyl group having five to thirteen carbon atoms and X is selected from the group consisting of an alkali metal, an alkaline earth metal, ammonium or a substituted ammonium radical;

(b) at least one non-ionic surfactant cosolvent in an amount effective to assist in the solvation of said dialkylsulfosuccinate; and
    (c) from about 10 to about 20% w/w water,
        wherein said formulation is substantially free of volatile organic compounds.

20. The concentrated aqueous dialkylsulfosuccinate wetting agent formulation according to claim 19, wherein $R^1$ and $R^2$ are selected from the group consisting of $C_5$, $C_6$, $C_8$ and $C_{13}$ alkyl groups.

21. The concentrated aqueous dialkylsulfosuccinate wetting agent formulation according to claim 19, wherein X is an alkali metal or an alkaline earth metal.

22. The concentrated aqueous dialkylsulfosuccinate wetting agent formulation according to claim 19, wherein said dialkylsulfosuccinate is dioctyl sodium sulfosuccinate.

23. The concentrated aqueous dialkylsulfosuccinate wetting agent formulation according to claim 19, wherein said nonionic surfactant cosolvent is an ethoxylated alcohol.

24. The concentrated aqueous dialkylsulfosuccinate wetting agent formulation according to claim 23, wherein said ethoxylated alcohol is selected from the group consisting of (i) ethoxylated tridecyl alcohol having about 8.5 moles of ethylene oxide units per mole of hydroxyl group, (ii) ethoxylated nonylphenol having about 9 moles of ethylene oxide units per mole of hydroxyl group, (iii) polyethylene glycol having a molecular weight of about 400 and (iv) mixtures thereof.

25. The concentrated aqueous dialkylsulfosuccinate wetting agent formulation according to claim 19, wherein said nonionic surfactant cosolvent is present in said formulation in a range of about 10 to about 20% w/w.

26. The concentrated aqueous dialkylsulfosuccinate wetting agent formulation according to claim 19, wherein a viscosity of said formulation is about 700 cps or less, and wherein a flash point of said formulation is 141° F. or greater.

27. The concentrated aqueous dialkylsulfosuccinate wetting agent formulation according to claim 26, wherein a viscosity of said formulation is about 500 cps or less.

28. The concentrated aqueous dialkylsulfosuccinate wetting agent formulation according to claim 26, wherein a flash point of said formulation is 200° F. or greater.

29. The concentrated aqueous dialkylsulfosuccinate wetting agent formulation according to claim 19 comprising:
    (a) from about 40 to about 75% w/w of said dialkylsulfosuccinate;
    (b) from about 10 to about 20% w/w of said non-ionic surfactant cosolvent; and
    (c) from about 10 to about 20% w/w of water.

30. The concentrated aqueous dialkylsulfosuccinate wetting agent formulation according to claim 29, wherein a viscosity of said formulation is about 700 cps or less, and wherein a flash point of said formulation is 141° F. or greater.

31. The concentrated aqueous dialkylsulfosuccinate wetting agent formulation according to claim 29, wherein said dialkylsulfosuccinate is dioctyl sodium sulfosuccinate.

* * * * *

UNITED STATES PATENT AND TRADEMARK OFFICE
CERTIFICATE OF CORRECTION

PATENT NO. : 5,512,211
DATED : April 30, 1996
INVENTOR(S) : Brian J. McSwigan, Gerard E. Linkowski It is certified that error appears in the above-indentified patent and that said Letters Patent is hereby corrected as shown below:

On the title page, item [75] one of the inventor's name was misspelled. Gerard E. Lindowdki name should be as follows:

Gerard E. Linkowski

Signed and Sealed this

Thirteenth Day of August, 1996

Attest:

BRUCE LEHMAN

*Attesting Officer*      *Commissioner of Patents and Trademarks*